United States Patent
Kelley et al.

(10) Patent No.: US 6,496,270 B1
(45) Date of Patent: Dec. 17, 2002

(54) METHOD AND SYSTEM FOR AUTOMATICALLY GENERATING REFERENCE HEIGHT DATA FOR USE IN A THREE-DIMENSIONAL INSPECTION SYSTEM

(75) Inventors: Robert W. Kelley, Ann Arbor, MI (US); Donald K. Rohrer, Whitmore Lake, MI (US); John J. Weisgerber, Whitmore Lake, MI (US); Donald J. Svetkoff, Ann Arbor, MI (US)

(73) Assignee: GSI Lumonics, Inc., Kanata (CA)

( * ) Notice: Subject to any disclaimer, the term of this patent is extended or adjusted under 35 U.S.C. 154(b) by 0 days.

(21) Appl. No.: 09/506,144

(22) Filed: Feb. 17, 2000

(51) Int. Cl.$^7$ ............................. G01B 11/24; G01N 21/00
(52) U.S. Cl. ..................................... 356/602; 356/237.5
(58) Field of Search ................................. 356/394, 375, 356/376, 237.1, 237.2, 237.3, 237.4, 237.5, 601, 602, 612, 614, 623; 250/559.2, 559.22, 559.23, 559.29, 559.31, 559.34; 348/125, 126; 382/154, 190, 145, 146

(56) References Cited

U.S. PATENT DOCUMENTS

| | | | |
|---|---|---|---|
| 4,650,333 A | * 3/1987 | Crabb et al. ................. | 356/376 |
| 4,677,302 A | * 6/1987 | Chiu et al. .................. | 250/560 |
| 5,088,828 A | 2/1992 | Doemens et al. | |
| 5,200,799 A | * 4/1993 | Maruyama et al. ......... | 356/394 |
| 5,329,359 A | * 7/1994 | Tachikawa .................. | 356/398 |
| 5,444,537 A | * 8/1995 | Yoshimura et al. ......... | 356/376 |
| 5,450,204 A | 9/1995 | Shigeyama et al. | |
| 5,465,152 A | 11/1995 | Bilodeau et al. | |
| 5,780,866 A | * 7/1998 | Yamamura et al. ...... | 250/559.22 |
| 5,822,449 A | 10/1998 | Kobayashi et al. | |
| 5,862,973 A | 1/1999 | Wasserman | |
| 5,902,353 A | 5/1999 | Reber et al. | |
| 5,903,353 A | * 5/1999 | Raymond .................... | 356/376 |
| 6,005,669 A | * 12/1999 | Pahk et al. .................. | 356/376 |

FOREIGN PATENT DOCUMENTS

| | | |
|---|---|---|
| JP | 04106267 | 11/1993 |
| JP | 06011321 | * 1/1994 |
| JP | 08152299 | 12/1997 |

OTHER PUBLICATIONS

P. Mengel, Automated Inspection of Solder Joints on PC Boards By Supplementary Processing of 3D and Gray-Level Images, IECON 1990, Nov.

* cited by examiner

Primary Examiner—Hoa Q. Pham
(74) Attorney, Agent, or Firm—Brooks & Kushman P.C.

(57) ABSTRACT

A method and system for automatically generating reference height data for use in a 3D inspection system are provided wherein local reference areas on an object are initially determined and then the height of these local reference areas are determined to generate the reference height data. When the object is a printed circuit board, the local reference areas are located relative to predetermined interconnect sites where solder paste is to be deposited or components placed and from which the relative height of the solder paste or components is to be determined using the reference height data during the subsequent inspection process.

29 Claims, 4 Drawing Sheets

METHOD AND SYSTEM FOR AUTOMATICALLY GENERATING REFERENCE HEIGHT DATA FOR USE IN A THREE-DIMENSIONAL INSPECTION SYSTEM

TECHNICAL FIELD

This invention relates to methods and systems for automatically generating reference height data for use in a three-dimensional inspection system. The invention is particularly well adapted for use in 3D inspection systems for solder paste and component inspection where 3D data is to be obtained from at least one reference region of the circuit. A baseline (zero) reference height data is used to calculate the height of paste, leads, or components. Other applicable calculations and measurements include area, volume, x & y position and orientation.

BACKGROUND ART

Over the past several years, the use of 3D inspection for solder paste, components, microelectronic assemblies etc. has proven to be beneficial for both process control and random defect detection. In particular, 3D systems have shown capability of correlating defects at the end of line (i.e., electrical test) with solder paste volume. Hence, 3D process control can be used to maximize yield. Unfortunately, because board warpage is on the order of the inspection tolerance, and additional stackups include tilt and positioning of the board, some method of finding a baseline local reference plane or surface is needed.

The data to provide such a reference may be obtained from bare or covered conductor traces, pads, 3D fiducials, board fiducials, ground planes, or fiberglass backgrounds. Specially fabricated opaque 3D fiducials which have built-in contrast and predetermined locations, would perhaps be ideal but are not practical in many cases due to retooling cost. Therefore, data from the circuit boards, the configurations of which vary greatly, is needed.

SMT boards are being produced with increasing density and, when vision systems are utilized for inspection, time-consuming setup procedures are often required to "teach" the inspection locations and criteria for 3D inspection. In contract manufacturing environments, where changeover is frequent, time-consuming setup reduces the value of the vision system in the overall process. In contract manufacturing environments changeover is so frequent that use of CAD data and supplementary data like Gerber files becomes unwieldy due in part to limited availability of such information.

Although the use of CAD download to specify interconnect locations (i.e., chip pad sites) has mitigated the problem to some degree, the CAD data often lack specific, or at least the best, information needed for 3D inspection. 3D inspection and measurement systems require a height reference for accurately determining the height, area, and volume of solder paste and/or lead or component height, presence/absence, and position (x,y, and orientation). For example, it is desirable to place inspection windows on bare conductor pad regions in close proximity to a paste deposit, but this is rarely possible because available pad areas will be covered by paste. In order to define an accurate height reference plane at the feature to be inspected, numerous reference sites surrounding the feature need to be defined. Special board designs to place fiducials at predetermined locations are possible, but rarely practical because of board re-tooling and design costs. As a result, traces on the board, which may be covered by solder mask, are often manually specified by the user to provide reference height information. Manually identifying reference points to do 100% inspection of a large (18"×18") board can take several hours. Contract manufacturers require the programming of such a board to be less than 30 minutes, and preferably much less.

A system which provides the benefit of three-dimensional inspection, which is preferably 100% of every board, yet provides a method for fast, automatic learning, is advantageous. Built-in error detection is particularly advantageous in contract PCB manufacturing environments where frequent changeover is required and many board designs are produced in relatively low volume.

Mengel, P., "Automated Inspection of Solder Joints on PC Boards By Supplementary Processing of 3D and Gray-Level Images", IECON 1990, November 1990 discloses the use of 3D and gray-level information for PCB inspection, including the use of CAD/CAM data for specifying the geometric positions and tolerances of components. In the absence of CAD data, a "teach-in" on a sample PCB is performed. "An interactive interface" is disclosed which permits correction or optimization of testing instructions for special format devices.

U.S. Pat. No. 5,088,828, Doemens et al., discloses the use of evaluation windows on a PCB for recognizing defects of interconnects and defines zero datum. A triangulation-based 3D sensor is used for measurement. Also disclosed is the use of a detector for fluorescent light arising upon incidence of the laser beam on the insulating material. The invention includes a step of comparing the dimensions of the interconnect with stored spacing criteria by identifying the width or areas having a height of zero. Scan fields offset with respect to one another are used to determine warping.

U.S. Pat. No. 5,450,204, Shigeyama et al., discloses a 3D inspection machine for measuring the position, area, and thickness of amount of creamed solder and comparing with stored reference data. The sensor is effectively a phased shifted 3D Moire system. An inspection file is produced by downloading CAD data for a screen mask.

U.S. Pat. No. 5,822,449, Kobayashi et al., discloses a method for teaching without exclusively using the inspection machine. Data about pictures and decision criteria are stored and composed, and by being externally obtained, avoids manual entry operation. An adjustment step is provided for parameters including the positions of components, data of lands, bridge detection, and mounting qualities. Also, step ST17 is teaching modification to modify data which results if the "improper portion is found as the results of the automatic inspection".

U.S. Pat. No. 5,465,152, Bilodeau et al., discloses the use of opaque fiducials as index pads (reference points) "designed in" at predetermined locations of a substrate for coplanarity and warpage determination. This approach generally must be included at the board design stage which would incur substantial tooling costs and delays.

U.S. Pat. No. 5,862,973, Wasserman, combines video camera inspection with structured light for solder paste detect detection and statistical process control.

U.S. Pat. No. 5,902,353, Raymond, discloses relative height measurement of components where "key points", which may be points on the board under test or on components, are used and the height measurement compared with a reference to determine faulty placement. The preferred height detection system disclosed is a triangulation-based PSD point detection system. Componentbycomponent programming, automatic or manual, can include parts list, component and board geometries, machine instructions, and solder paste stencil information. The use of a miniature video camera is suggested for manual fiducial alignment and for manually specifying key points for each component. The set of key points for component measurement preferably includes at least one reference.

None of the prior art references teach or disclose a method and system for automatic learning of reference points in a 3D inspection machine, wherein a machine vision subsystem automatically locates and analyzes image data for establishing a baseline height reference.

DISCLOSURE OF INVENTION

The primary object of the present invention is to provide a method and system for automatically generating reference height data for use in a three-dimensional inspection system.

In carrying out the above object and other objects of the present invention, a method is provided for automatically generating reference height data for use in a 3D inspection system. The method includes automatically determining positional location of at least one local reference area on an object separate from but relative to a predetermined site on the object.

Preferably, the step of automatically determining includes the steps of imaging the object to obtain image data and processing the image data to obtain the location of the at least one local reference area.

The object may be a printed circuit board and the predetermined site may be an interconnect site. The step of processing the image data may include the step of processing the image data with conductor coordinate information which represents location and/or connectivity of conductor runs separated from the interconnect site.

The step of sensing may include the step of imaging.

The predetermined site may be substantially coplanar to the at least one local reference area. Also, the step of sensing may include the step of sensing height of a plurality of portions of the at least one local reference area to obtain data and processing the data to obtain the corresponding signal.

Also, the step of automatically determining may automatically determine locations of a plurality of substantially planar local reference areas wherein the step of sensing senses height of at least a portion of the plurality of local reference areas and generates corresponding signals and wherein the step of processing processes the signals to obtain the reference height data.

Further in carrying out the above object and other objects of the present invention, a system is provided for automatically generating reference height data for use in a 3D inspection system. The system includes a machine vision subsystem for automatically determining location of at least one local reference area on an object separate from but relative to a predetermined site on the object. The system includes a 3D sensor for sensing height of at least a portion of the at least one local reference area on the object and generating a corresponding signal. Still further, the system includes a signal processor for processing the signal to obtain the reference height data.

The machine vision subsystem typically includes an imaging section to image the object to obtain image data and a data processing section for processing the image data to obtain the location of the at least one reference area. The imaging section may include a video camera.

The 3D sensor may be a triangulation sensor and preferably the triangulation sensor includes a laser scanner.

The object may be a printed circuit board and the predetermined site may be an interconnect site.

The predetermined site is preferably substantially coplanar to the at least one local reference area.

The 3D sensor may be part of the machine vision subsystem.

The 3D sensor may include a projector for projecting a point, line grid, or other pattern onto the local reference area.

Still further in carrying out the invention, a method and system are provided in which a height sensor acquires location information for establishing a height reference. The height reference is located relative to predetermined interconnect sites where paste is to be deposited or components placed, and from which the relative height of solder paste or components is to be determined using the reference heights during the subsequent inspection process. An algorithm determines the location of an appropriate set of reference point locations and designates at least the x,y coordinate information for later use by the inspection program.

The algorithm automatically determines from image data, acquired prior to executing an inspection algorithm, the position relative to the interconnect for placement of at least one reference box or areas from which the relative height of solder paste or components is to be determined.

A plurality of reference boxes may be for a reference surface, such as a plane, which substantially intersects the interconnect location in three dimensions.

The learning algorithm may be executed using a bare circuit board, a board with solder paste deposits, a board with components attached, and may be supplemented with CAD information.

The locations where the reference boxes are to be placed may generally be distant and disjoint from image regions where the interconnects are located.

In a preferred method and system, all the height reference locations on the circuit board are found automatically, but an alternative semi-automatic embodiment in which interaction with the operator through a user interface to guide the learning process is within the scope of the invention provided a subset of all height reference point locations are found without operator supervision.

Alternatively, a "learn on the fly" algorithm automatically determines from image data, acquired during the execution of the inspection program, the position relative to the interconnect for placement of reference boxes from which the relative height of solder paste or components is to be determined.

The "on the fly" approach may avoid archival storage of the reference locations prior to an initial inspection. The reference data may be recalculated during the inspection process, or stored in memory.

The imaging system and/or computer used for the automatic learning phase may be physically separated from that of the inspection system, resulting in an "off-line" learning environment.

The algorithm may search a region in the proximity of an interconnect, for a conductor in close proximity to the interconnect, or a conductor connected to the interconnect.

Conductor surfaces are preferred for reference points, or traces covered with dielectric.

However, the algorithm may elect to use surfaces other than the conductors, for example, the fiberglass board surface if the corresponding height data is accurate.

The algorithm may store the height data from a reference box for later use and comparison with specifications.

The stored height data may be the average height obtained from height data in the reference box.

In contrast to the average height from the entire reference box, the calculated height may be from data points from a portion of the box, where the data points are obtained from a segmentation algorithm.

The algorithm may search the perimeter of the image for conductor traces; the conductor traces may run in the horizontal, vertical or diagonal directions.

The algorithm may include regions other than conductor traces, including, for example, ground planes, fiberglass, silk-screened areas, patterns which are laser marked or etched, or a suitable combination thereof.

The algorithm may perform an automatic thresholding operation which locates a reference surface in a reference box comprising image data from both the reference surface and the background.

The algorithm may perform an automatic thresholding operation which locates a reference surface in an image where the solder paste is deposited on the interconnect sites, and the resulting information may be stored.

The algorithm may perform "blob" or region analysis on the data resulting from the automatic thresholding operation, where the blob is formed by a segmentation operation to distinguish the background region from the reference data.

The blob analysis may include area, length, width, perimeter, aspect ratio or similar measures.

The blob may correspond to a portion of a conductor trace bounded by a reference box.

The blob may correspond to a region having substantially homogeneous grey-scale or height data, as often found for fiberglass and ground plane materials.

The image data may be supplemented with conductor coordinate information describing the location and/or connectivity of conductor runs separated from the interconnect. The algorithm automatically determines from image data, acquired prior to inspection, the position relative to the interconnect for placement of reference boxes from which the relative height of solder paste or components is to be determined. For instance, this may be provided as a "Gerber file," where the coordinate information is used to distinguish conductor image data from other circuit board materials (i.e. a "knowledge based" segmentation algorithm).

At least one channel of height information is required in the inspection system but the image data for automatic learning and determination of box locations can be 3D, color or grey-scale information alone, or any combination thereof. The grey-scale information can be obtained from a standard video camera or from "non-conventional" imaging systems such as X-ray.

The preferred imaging system and method is disclosed in U.S. Pat. No. 5,024,529 where a laser scanner rapidly acquires both full field grey-scale and height (3D) information in perfect temporal and spatial registration. Also, the teachings of U.S. Pat. Nos. 5,546,189 and 5,617,209 can be used advantageously.

Prior art segmentation techniques as taught in U.S. Pat. No. 4,928,313 to Leonard et al. can be used for image processing.

The image data may be acquired by a laser system, but a video camera can be used for automatic determination of box locations from which height data is to be obtained during inspection.

Height data may be acquired as part of the learning process to improve reliability and robustness.

The video camera used for automatic determination of box (height reference) locations may also be used to obtain the height information.

The imaging system may comprise a plurality of sensors which are packaged as a single unit or separately, and which may acquire data either sequentially or in parallel.

The height data may be acquired using a triangulation sensor or alternatively, defocus or focus information, phase detection (Moire), or color encoding.

The 3D sensor may include a projector providing a point, line, grid, or other pattern onto the surface which is processed and decoded to provide height data.

The reliability of reference boxes may be qualified with the use of a consistency measure with other reference boxes in the proximity of an interconnect site. The reliability qualification may include analysis regarding the distribution of the reference boxes to verify that the reference surface computation at the position of the feature to be inspected is stable.

In determining the reliability of the reference data, a repeatability analysis may be performed wherein a best fit surface is calculated and the corresponding error distribution is analyzed.

During the learning process, and subsequent to the reliability analysis, instructions may be provided to the operator regarding preferred locations for the reference points so as to improve the stability and repeatability of the data The results of the reliability qualification may be reported to the operator and interactively modified prior to inspection.

The learning algorithm may include steps where unsuitable reference locations are rejected, for instance by an "outlier" analysis which identifies locations which are not consistent with other data describing the reference surfaces.

The consistency measure may be deviations from a reference plane computed over at least three reference box locations containing height data.

Based upon consistency stability measurement, the system can automatically search in critical areas to identify alternate sites to automatically improve computational stability and/or consistency.

BRIEF DESCRIPTION OF DRAWINGS

FIG. 2 also shows regions of the board where few traces exist and wherein a combination of the board surface and conductor pads are identified as potential reference regions;

FIG. 4-B is a schematic diagram of the preferred system;

FIG. 4-C shows a camera for providing grey-scale and color information along with 3D sensing or a projected pattern.

BEST MODE FOR CARRYING OUT THE INVENTION

Figure 1:
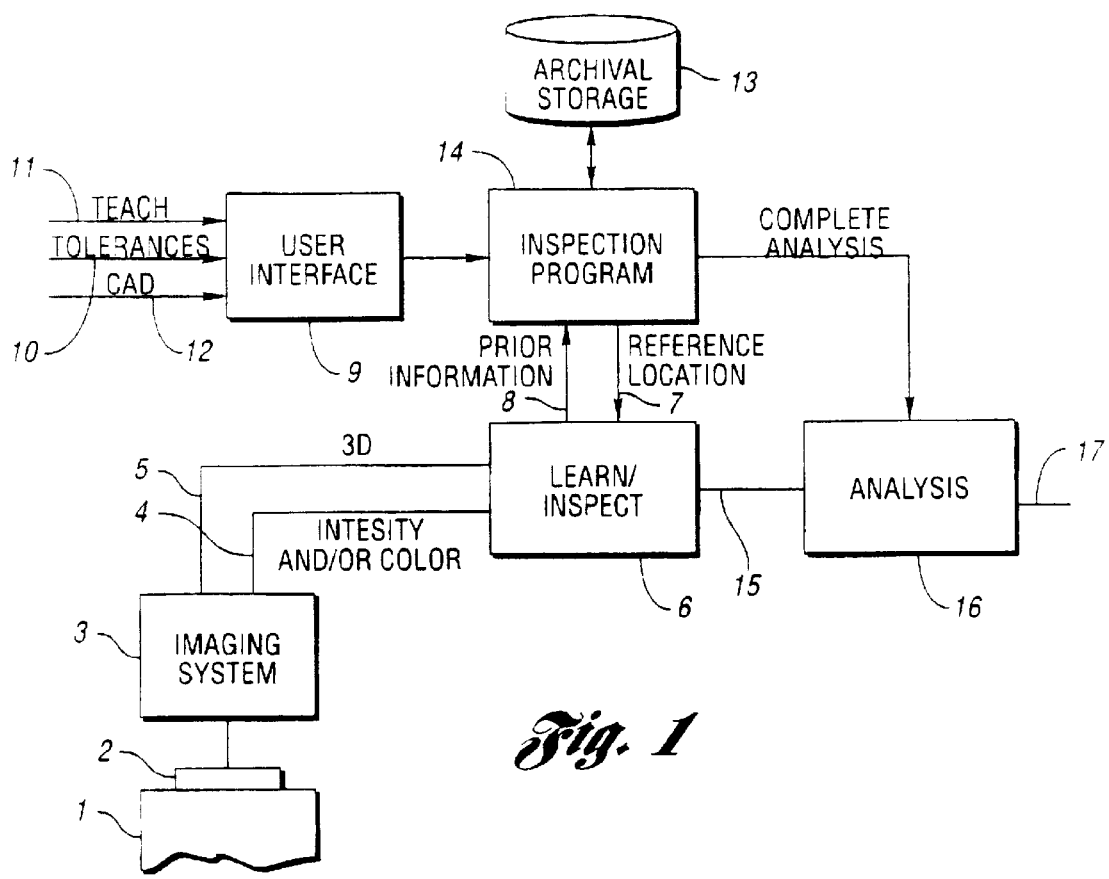
FIG. 1 illustrates the key elements of a system constructed in accordance with the present invention.

An automatic learning method and system for generating reference height data for use in a system for three-dimensional inspection of PCBs is provided herein. Referring to FIG. 1, a data file, preferably CAD format, provides information along line 12 about the coordinates of interconnect sites (illustrated in FIG. 2) upon which, for example, solder paste is deposited and/or components placed.

A vision system, which may utilize a plurality of sensors for acquisition of grey-scale, color, or height information, analyzes image data and locates regions suitable for height measurement which are typically separated from the interconnects. The vision system includes an imaging system 3 and a data reduction or analysis system as part of the learn/inspect module 6 as illustrated in FIG. 5.

Figure 2:
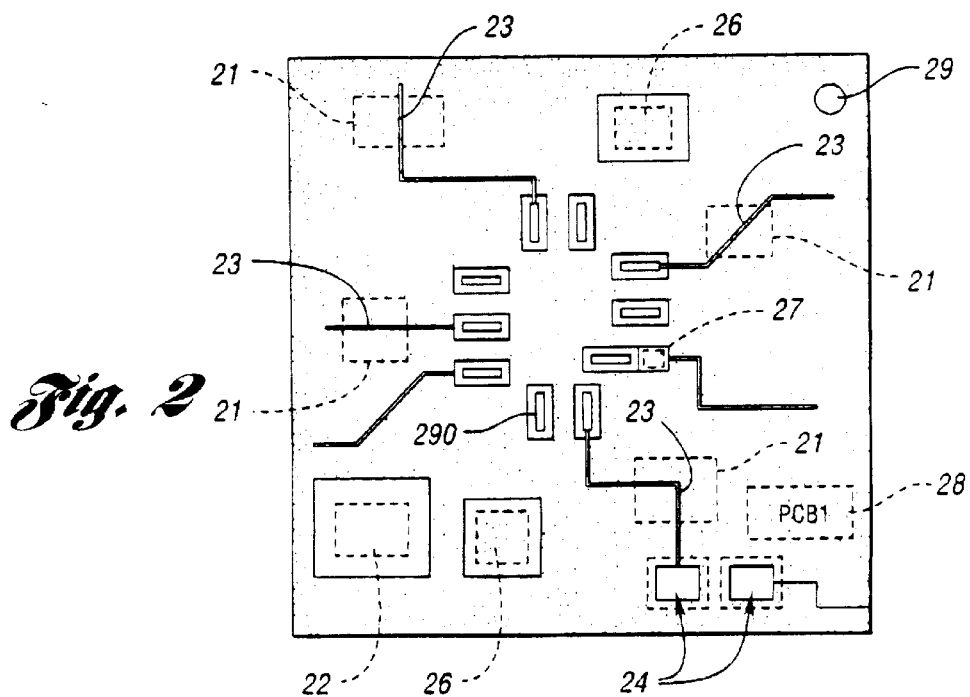
FIG. 2 shows, by way of example, the appearance of a PCB in a field of view of a vision system, where the board features include interconnect regions, traces, and fiberglass materials.

Referring now to FIG. 2, most often the reference regions 21 (dashed boxes in FIG. 2) selected are bare or solder mask covered conductor traces 23 but may be fiducials, ground planes, or other opaque regions, or alternatively the board surface as illustrated at 26. FIG. 2 shows, by way of example, the appearance of PCB data in a field of view of the vision system, where the board features include interconnect regions, traces, and fiberglass materials. FIG. 2 shows regions of the board where few traces exist and a combination of the board surface 26 and conductor pads 24 are identified as potential reference regions. The vision system may locate using a single channel of data (i.e., grey-scale or color video) or 3D data, or any combination thereof to identify possible regions for obtaining reference data. This process may be CAD assisted, for example, with a Gerber file defining trace connectivity or rely totally upon image contrast and processing techniques. However, in the preferred system of the invention the reliance upon CAD data is diminished.

Height information is extracted from at least one of these regions during inspection, but preferably also during a learning or teaching phase. Alternatively, in some cases, video camera data may be used with an algorithm to identify regions which may contain acceptable reference data. In either case, an algorithm uses 3D data to estimate the height of the paste or components at interconnect sites during inspection by computing the difference in height between the reference surface or location(s) and the component or paste.

Figure 5:
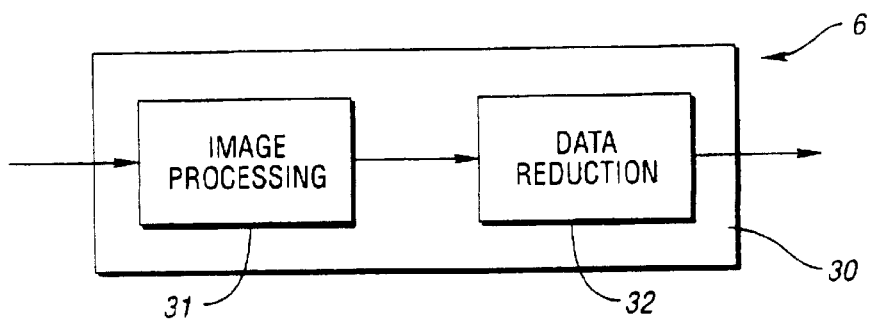
FIG. 5 is a schematic block diagram of the learn/inspect module.

A set of metrics are used by a learning or image processing algorithms 31 and 32 of FIG. 5 to assess the suitability of the reference points during the teaching phase whereby operator intervention is minimized. Design and process guidelines such as the solder paste thickness, minimum trace width and component geometry are also used to guide the learning algorithm.

The following paragraphs further illustrate the operation of a preferred system. However, the following description is intended to be illustrative rather than restricted. Those skilled in the art of image data acquisition, image processing, and dimensional measurement will recognize that various substitutions and changes of the structure and function can be made without departing from the scope of the invention.

FIG. 1 illustrates the key elements of an automatic learning system of the present invention.

In a preferred embodiment, a board 2 is positioned within the system with positioner (conveyor) 1 and the imaging system 3 is translated in the x,y,z three-dimensional coordinate system to capture image data.

The imaging system 3 may be a collection of sensors or an integrated unit capable of acquiring image information from substantially 100% of the circuit board 2 to be inspected. For example, in an embodiment shown in FIG. 4-A, a camera 51 is mounted adjacent to a light projector 52 and a triangulation-based sensor 53 for providing video camera data and height data, in this case, which are offset. This approach is described, for example, in U.S. Pat. No. 5,862,973 noted above.

Figure 4A:
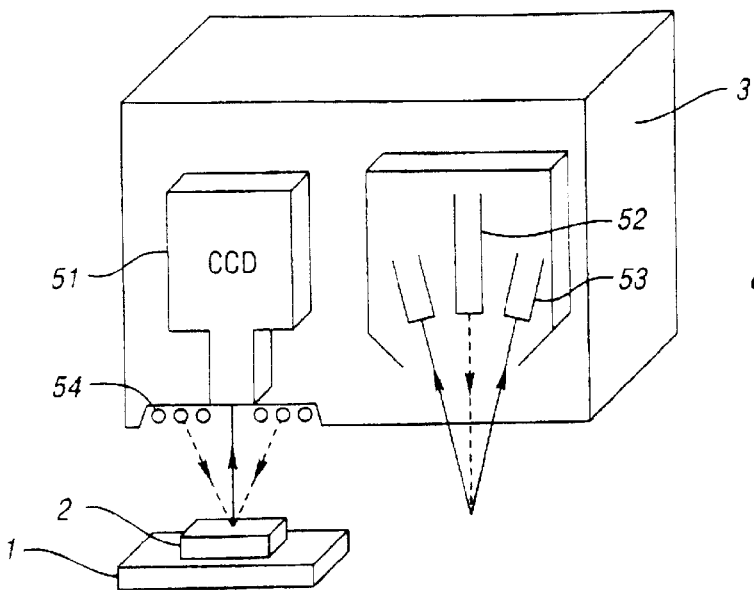
FIG. 4-A is a schematic view of a system of the present invention including an imaging system with a camera mounted adjacent a 3D sensor.
Figure 4C:
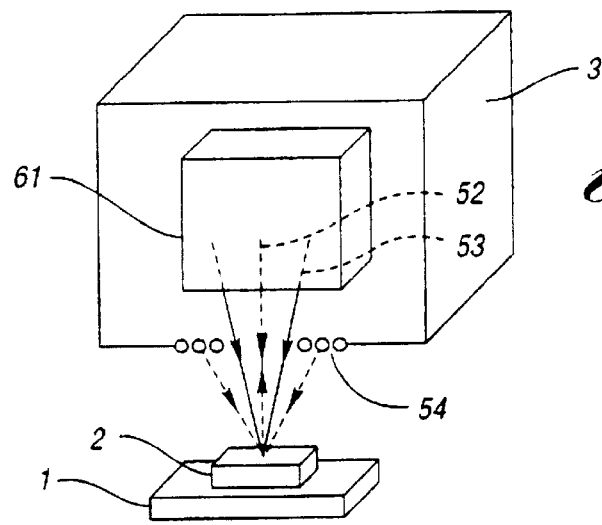
Figure 4B:
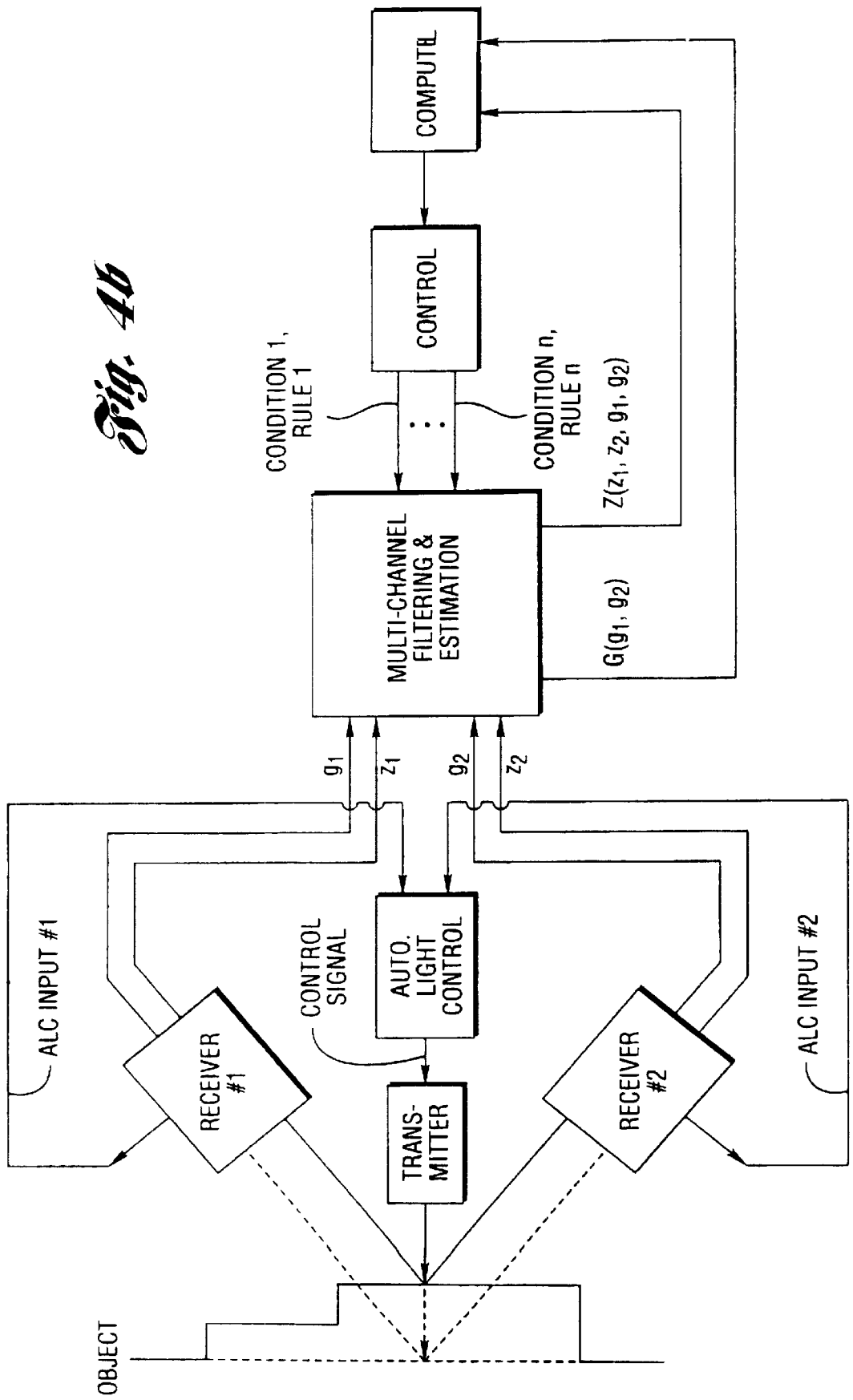

The preferred imaging system is described, shown in FIG. 4-B, in U.S. Pat. No. 5,546,189 which acquires perfectly registered height (3D) and intensity data in parallel, at or near video rates. Other combinations of 3D and grey-scale sensors are known in the art and may be used to practice the present invention. For example, in FIG. 4-C, a video camera 61 is used to acquire conventional grey-scale or color data and also as a structured "line of light" sensor.

The article 2 to be scanned, typically a printed circuit board which may be bare, populated, or have solder paste deposited thereon, is often positioned with the conveyor 1. However, it should be noted that the method of the present invention can also be implemented at an "off-line" station thereby not interfering with any production processes. This constraint is not an issue with the "learn on the fly" approach to this invention where the first board to be inspected is used in the learning process.

The minimal set of data to be produced by the imaging system 3 is to support identification by the learning algorithms of the learn/inspect module 6 of reference locations on the board 2. The reference data is used to find a reference surface, such as a plane, from which the height of paste, components, or leads (for example) are to be determined during an inspection step, but preferably also during learning. In some cases, where information is needed only in sparse regions of the image, a single reference box may be sufficient, or perhaps a pair of boxes connected by a line in 3D space. These locations may include x,y coordinates relative to a local or global fiducial 29 or may be the fiducial 29 on the circuit board, which are generally present for component placement machines. The x,y coordinates may be supplemented with information like the size of the area to be processed to determine the location and depth of the reference point.

The x,y coordinates or an associated region may define the location of traces 23, bare pads 24, ground planes 22, and pad areas adjacent to a deposit 27 which have adequate area for referencing, or the fiberglass board background 26 provided that the accuracy and the statistical variation in the height data from these translucent regions are within tolerances. Knowledge-driven algorithms may utilize offsets or statistical information to weight the reference regions based upon the confidence of the data. In a preferred embodiment the reliability of the data used for referencing an interconnect region will be qualified using statistical measures and "outlier" analysis, to only accept regions identified suitable for referencing.

The image processing and data reduction techniques used in blocks 31,32 of FIG. 5 to identify regions and reduce data may be selected combinations of methods and algorithms which are generally known to those skilled in the art, or modified, improved versions of such algorithms. These include background/foreground segmentation, histogram and statistical analysis, pixel counting, region growing and blob analysis, edge and/or line detection and tracking, and connectivity analysis, among others.

For example, the algorithm may search the perimeter of the image for conductor traces which are known to be oriented in horizontal, vertical, or diagonal 45° direction in the image plane. A local height or grey-scale threshold may be used to separate the conductor "foreground" from the board "background" (i.e., fiberglass) thereby, upon bounding with a reference box of predetermined size, creating a "blob". Likewise, the algorithm may use the fact that interconnects are often connected to adjacent traces, and these traces may be segmented and tracked in such a way to provide a good distribution of points for surface fitting throughout the image. Many of the fundamental techniques to support advanced image analysis are described in the early literature, for instance COMPUTER VISION, Ballard and Brown, 1982. In addition, many advancements in image processing are available to those skilled in the art.

When height data is used for feature location, either alone or in combination with video or laser intensity data, the entire learning process may be improved because of the 3D information content. As such, feature extraction using 3D and grey-scale data is preferred in the blocks 31,32 of FIG. 5. For example, the contrast of the trace in FIG. 2 in video data along with the height contrast in 3D leads to reliable classification.

Furthermore, advancements in processor speed and along with revolutionary changes in high-density, high-speed, memory support the multichannel high learning approach described herein without requiring the burden of special purpose image processing hardware. These widely recognized advancements will continue and can be utilized advantageously to practice the present invention.

The information in the candidate reference regions or areas may be further analyzed over the image for consistency using a pre-defined set of metrics supplied to the learning program through the user interface 9. This information may be in the form of tolerance data on line 10, CAD data on line 12 for assisted segmentation and classification, and/or program instructions or other a priori information on lines 10–12. In a preferred embodiment there will be a large overlap between the image processing algorithms 30 of FIG. 5 used for learning and the actual algorithms used for inspection.

Figure 3:
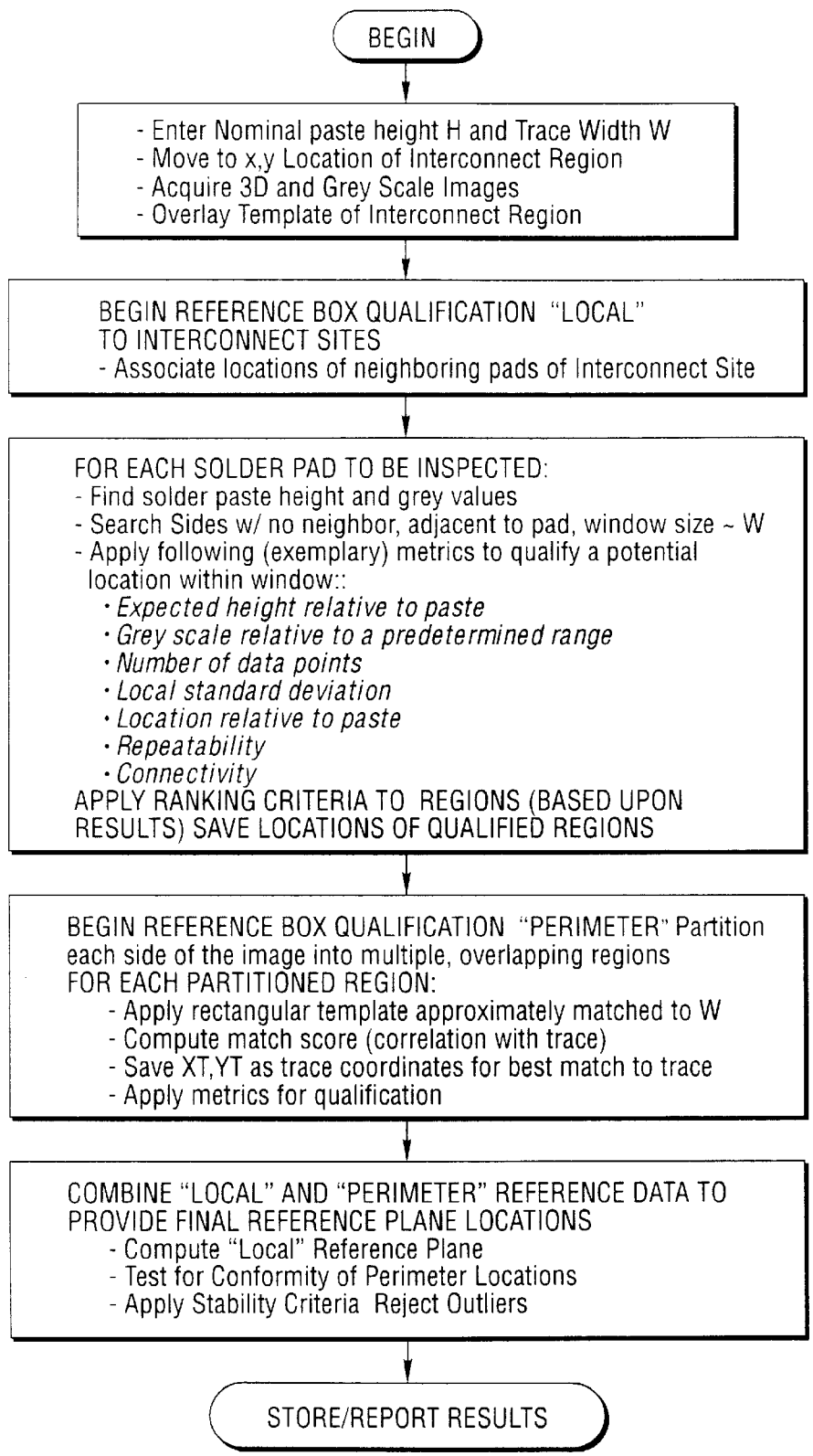
FIG. 3 is a block diagram flow chart illustrating details of data reduction steps utilized in a preferred embodiment of the invention and which use both grey-scale and height data.

FIG. 3 is a flow chart illustrating details of data reduction steps of block 32 in a preferred embodiment using both grey-scale and height data. In the preferred system an output of the learn/inspect module 6 is the reference locations and possibly statistical information like standard deviation over the region to be used as reference data. In the preferred embodiment, the learning system as a whole utilizes in part the inspection algorithms to provide an output which completes the "missing parts" of inspection program which, in combination with analysis module 16, provides the inspection results to the output 17, which may be in the form of a report or inputs to a SPC (statistical process control) module for tracking results.

In the preferred embodiment the results of the automatic learning process are available to the operator. The data will be available in both the form of a numeric summary of the results, for instance a repeatability analysis, and as image data for review. The operator may take steps to correct or optimize the results. In general, this is to occur for only a small percentage of the reference regions. In contrast to prior art interactive systems, in the preferred system the program will recommend to the operator a particular configuration of reference boxes 21 based upon stability and/or repeatability measurements, i.e. the algorithm performs self-correction.

The system may also be operated in a semi-automatic configuration where minimal operator intervention is used. Although the primary purpose of the invention is to minimize or eliminate such interaction, some degree of intervention or supervision can be beneficial. Prior art learning systems for 3D inspection have required extensive and tedious operator intervention and region identification which have reduced the value of the inspection system, particularly in contract manufacturing environments where minimal changeover time is a crucial factor. The process has usually involved an interactive session with the operator examining, "teaching," or verifying region selection on virtually the entire board. The method and system of the present invention greatly reduces the time and labor required.

The system and method described above is directed primarily toward printed circuit board learning and inspection, and is particularly advantageous for in-line 3D inspection. However, the method and system are applicable to any 3D imaging and inspection scenario where 3D data is used to establish a reference surface for computing object height, and where automatic learning is advantageous. For example, the invention may be used in the inspection of integrated circuits, BGA and chip-scale packages, tape automated bonding and similar processes. Likewise, the invention is not restricted to electronic inspection, but may be applied in other analogous areas.

The preferred embodiment describes a representative approach to the learning and inspection process. The above description is not intended to be restrictive. The invention is to be limited only by the following claims.

What is claimed is:

1. In a system for automatic three-dimensional inspection of objects such as circuit boards, integrated circuits, electronic packages, solder, components and the like, a method for automatically generating reference height data and using the reference height data in the system to estimate a height difference, the method comprising:
    (a) determining location of at least one local reference area separate from but relative to at least one predetermined site, wherein the step of determining:
        (i) is performed automatically without operator supervision to obtain reference height data at one or more reference locations of the at least one local reference area;
        (ii) includes the step of qualifying the reference height data based upon a metric applied to the reference height data to obtain qualified reference height data, wherein the qualified reference height data is used to establish a baseline reference for three-dimensional inspection;
    (b) providing coordinate information of the at least one local reference area for later use by a three-dimensional inspection program; and
    (c) inspecting the object wherein a height difference is estimated based upon the qualified reference height data from the at least one local reference area.

2. The method as claimed in claim 1 wherein the step of determining includes obtaining image data and processing the image data to obtain the location of the at least one local reference area.

3. The method as claimed in claim 2 wherein the at least one predetermined site is an interconnect site and wherein the step of processing the image data includes the step of processing the image data with conductor coordinate information which represents at least one of location and connectivity of conductor runs separate from the interconnect site.

4. The method as claimed in claim 2 wherein the step of determining automatically determines locations of a plurality of substantially planar local reference areas and wherein the step of imaging senses height of at least a portion of the plurality of local reference areas and generates corresponding signals and wherein the step of processing processes the signals to obtain the reference height data.

5. The method of claim 1 wherein the step of providing coordinate information includes adjusting a coordinate of a reference location based on a predetermined height offset between the reference location and the at least one predetermined site.

6. The method as claimed in claim 1 wherein the at least one predetermined site is an interconnect site on a circuit board where solder paste is deposited, and a relative height difference of the solder paste and an interconnect is estimated during inspection.

7. The method as claimed in claim 1 wherein the baseline reference is a plane and both the at least one predetermined site and the at least one local reference area substantially intersect the plane.

8. The method of claim 1 wherein the baseline reference is a reference surface and the step of qualifying includes the step of analyzing a distribution of a plurality of reference locations and selecting at least one reference location based on the distribution wherein deviations relative to the reference surface are improved with the selection.

9. The method of claim 1 wherein the baseline reference is a reference surface and wherein the step of qualifying includes the steps of ranking reference locations of a plurality of local reference areas separate from the at least one predetermined site and rejecting a subset of the reference locations based on the ranking wherein stability of computation of the reference surface is improved compared to the use of all reference height data from all reference locations.

10. The method of claim 9 wherein the step of ranking includes a step of measuring a local standard deviation within a region.

11. The method of claim 9 wherein the step of ranking includes a step of analyzing repeatability of the reference height data.

12. The method of claim 9 wherein the step of ranking is performed at a number of reference locations.

13. The method of claim 1 wherein the step of qualifying includes a step of analyzing deviations of the reference height data from a best fit surface.

14. The method of claim 1 wherein the step of determining includes obtaining gray scale information and using the gray scale information to locate a reference area.

15. The method of claim 1 wherein the step of determining is fully automatic and without any operator intervention.

16. The method of claim 1 wherein the step of qualifying includes assigning weights to reference height data based on statistical information.

17. The method of claim 1 wherein the step of qualifying includes the step of analyzing connectivity of circuit patterns.

18. The method of claim 1 wherein the at least one predetermined site has solder paste deposit.

19. The method of claim 1 wherein the at least one predetermined site has a mounted electronic component.

20. A system for automatic three-dimensional inspection of objects such as circuit boards, integrated circuits, electronic packages, solder, components and the like, the system comprising:

(a) means for determining location of at least one local reference area separate from but relative to at least one predetermined site, wherein the means for determining:

(i) determines the location automatically without operator supervision to obtain reference height data at one or more reference locations of the at least one local reference area;

(ii) includes means for qualifying the reference height data based upon a metric applied to the reference height data to obtain qualified reference height data, wherein the qualified reference height data is used to establish a baseline reference for three-dimensional inspection;

(b) means for providing coordinate information of the at least one local reference area for later use by a three-dimensional inspection program; and (c) means for inspecting wherein a height difference is estimated based upon the qualified reference height data from the at least one local reference area.

21. A system for automatic three-dimensional inspection of objects such as circuit boards, integrated circuits, electronic packages, solder, components and the like, the system comprising:

a machine vision subsystem including a 3D sensor for determining location of at least one local reference area separate from but relative to at least one predetermined site, wherein the subsystem:

(i) determines the location automatically without operator supervision to obtain reference height data at one or more reference locations of the at least one local reference area;

(ii) qualifies the reference height data based upon a metric applied to the reference height data to obtain qualified reference height data, wherein the qualified reference height data is used to establish a baseline reference for three-dimensional inspection; and a device for providing coordinate information of the at least one local reference area for later use by a three-dimensional inspection program of the system, wherein a height difference is estimated based upon the qualified reference height data from the at least one local reference area.

22. The system as claimed in claim 21 wherein the machine vision subsystem includes an imaging section to obtain image data and a data processing section for processing the image data to obtain the location of the at least one local reference area.

23. The system as claimed in claim 22 wherein the imaging section includes a video camera.

24. The system as claimed in claim 21 wherein the 3D sensor is a triangulation sensor.

25. The system as claimed in claim 24 wherein the triangulation sensor includes a laser scanner.

26. The system as claimed in claim 21 wherein the at least one predetermined site is an interconnect site.

27. The system as claimed in claim 21 wherein the at least one predetermined site is substantially co-planar to the at least one local reference area.

28. The system as claimed in claim 21 wherein the 3D sensor includes a projector for projecting a point, line, grid, or other pattern onto the at least one local reference area.

29. The system as claimed in claim 21 wherein the at least one predetermined site includes an interconnect site, and a conductor layer is located in proximity to the interconnect site.

* * * * *